June 20, 1950 W. C. BEACH 2,512,051
AUTOMATIC OPERATING ATTACHMENT FOR
SCREW MACHINES AND THE LIKE
Filed April 30, 1949
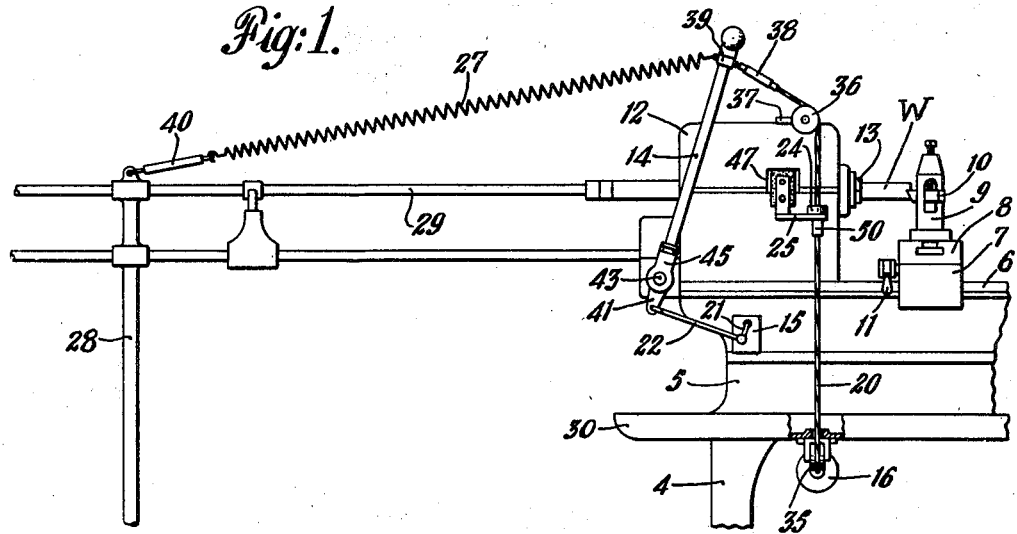
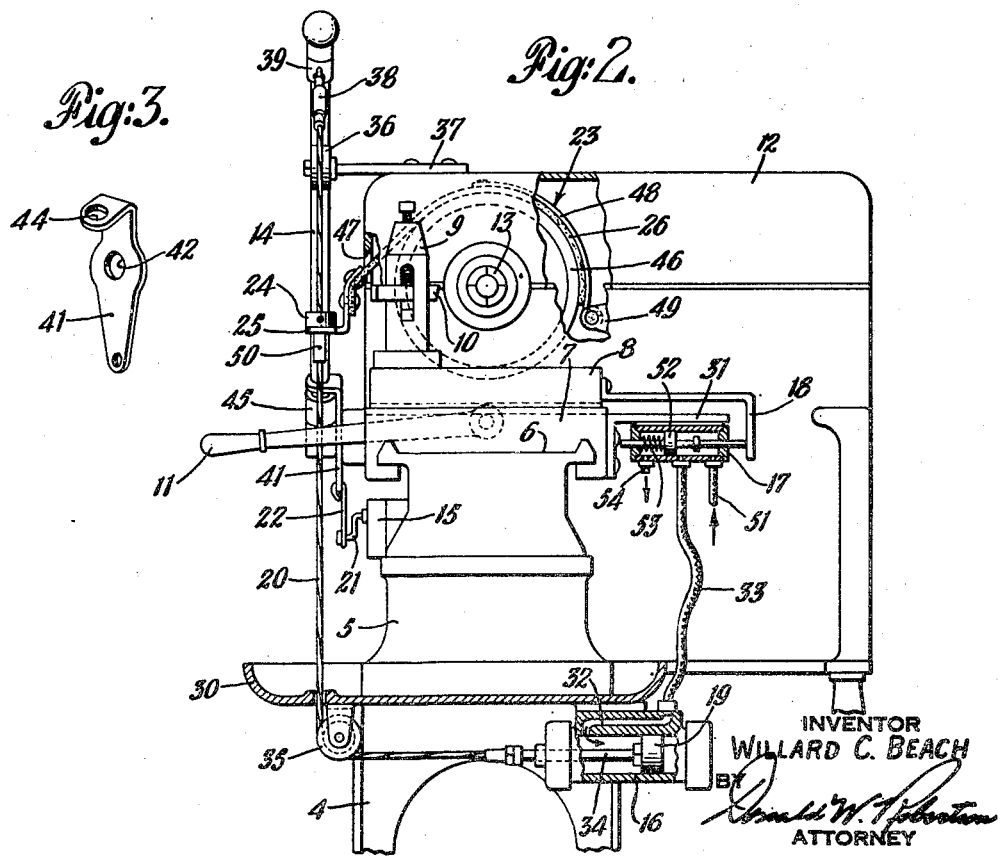
INVENTOR
WILLARD C. BEACH
ATTORNEY Patented June 20, 1950

2,512,051

UNITED STATES PATENT OFFICE 2,512,051

AUTOMATIC OPERATING ATTACHMENT FOR SCREW MACHINES AND THE LIKE

Willard C. Beach, Montville, N. J.

Application April 30, 1949, Serial No. 90,628

5 Claims. (Cl. 82—34)

The invention relates to screw machines and the like, and more particularly to automatic operating mechanism for hand screw machines.

The operating controls of a conventional type of hand screw machine include a collet or chuck actuating hand lever and a tool operating hand lever. When the machine is equipped with a stock feeding mechanism, the collet actuating lever also may serve to advance the stock. In other types of machines, such as engine lathes, the collet or chuck actuating lever may operate a clutch to disengage the spindle from the driving mechanism, permitting the chuck to come to rest when it is opened for removal of the work and insertion of a new workpiece. However, in the conventional hand screw machine the spindle may be permitted to continue its rotation. This is undesirable in machining certain types of work because of the danger of scratching or marring the surface, and in order to have a "dead" collet during removal and insertion of the workpiece the spindle must be stopped. With this type of operation it is necessary to switch off the driving motor, or de-clutch. Thus in such a case the operation of a conventional hand screw machine requires separate manipulation of the collet actuating hand lever, the starting and stopping switch (or clutch) and a tool operating hand lever such as, for example, the lever which operates the cross slide carrying the tool post or posts.

Assuming operation without an automatic stock feeding mechanism, and beginning with (1) the insertion of the workpiece into the open collet, the operator must perform in sequence the following additional steps: (2) close the collet, (3) start the spindle, (4) operate the cutting tool, (5) stop the spindle, (6) open the collet, and (7) remove the work. The performance of these steps involves a large number of motions, and demands much time and attention on the part of the machinist. The time required for the operation is further extended by reason of the necessity of allowing the spindle to come to rest after the motor has been switched off. However, it is absolutely essential in machining certain types of work that removal and insertion of the workpiece be performed only when the spindle is stationary. This is true, for example, in the machining of certain types of plastics.

It is an object of my invention to provide an improved automatic operating attachment which will greatly reduce the number of manipulations required for operation of a hand screw machine and the like, reduce the degree of skill required for the operation, and speed production.

Another object of my invention is to provide an attachment of the general character described which is simple and inexpensive to manufacture and which can be installed easily on many existing types of machines substantially without alteration. A particular feature of the mechanism which I have developed is its flexibility of adjustment and its adaptability to machines of various designs. Other objects and advantages will appear as the description proceeds.

While conventional screw machines of the fully automatic type eliminate manipulation of hand levers and other manual controls now found on hand screw machines, the use of such fully automatic machines is restricted to rod stock feeding operations, for they are not adapted to reverse stock feeding where the workpieces are inserted from the front of the chuck or collet, as is possible with hand screw machines. Also such automatic machines lack the flexibility of hand operation. For example with the hand operation the machinist can bring the tool up to the work very quickly, then slow down for the machining operation. Also the hand operation is much more sensitive, permitting utilization of the sense of touch and other skills acquired by the machinist. My invention is not directed to the provision of a fully automatic machine, but rather to the development of a mechanism which is applicable to existing hand machines to retain the primary advantages of hand operation while simplifying and speeding up that operation.

While certain attachments for hand screw machines have been devised heretofore with view to simplifying the operation of such machines, I know of none which accomplishes the objectives of my invention as stated, particularly as applied to reverse stock feeding, nor which do as much to speed production.

Referring to the drawings, Fig. 1 is a front elevational view of my preferred form of operating attachment illustrating its application to a conventional type of hand screw machine.

Fig. 2 is an end elevational view of the same apparatus, partly broken away in vertical cross-section.

Fig. 3 is a detail perspective view of the switch operating bracket for attachment to the collet actuating hand lever of the machine of Figs. 1 and 2.

In Figs. 1 and 2 only so much of the machine is shown as would in any way be helpful to a complete understanding of my invention and the manner in which it is applied to conventional hand screw machines and the like. The construction of such machines is of course well known and forms no part of the present invention. In general they comprise a supporting frame or table 4 on which rests the bed 5 having a longitudinal slide 6 on which is mounted carriage 7 with a cross slide 8 carrying a tool post 9 in which is secured a tool 10. A tool operating hand lever 11 operates the cross slide 8 transversely of the machine through a conventional rack and pinion or other well known mechanism. The spindle and associated driving mechanism are contained within a housing 12 mounted at the end of the machine. Collet 13 fixed to the spindle is arranged to be opened and closed by collet actuating hand lever 14. This too is conventional. A switch 15 starts and stops the operation of the machine. However it will be understood that in some types of machine to which the invention is applicable a clutch to disengage the spindle from the driving mechanism will be operated by the hand lever 14, in which case the motor switch would not be employed between operating cycles but only at the beginning and end of a work shift.

My invention in its general arrangement comprises a fluid pressure cylinder 16, a valve 17 associated therewith and controlled by the tool operating hand lever 11 through a bracket 18 fixed to cross slide 8, a piston 19 in cylinder 16 operatively connected through a flexible cable 20 to the collet actuating hand lever 14 and through the lever 14 to the starting or switch lever 21 of the spindle driving mechanism, as by means of a connecting rod 22, a brake 23 for the spindle, the piston 19 also being operatively connected to the brake as by means of a stop 24 adjustably secured to cable 20 for engagement with a bracket 25 attached to brake band 26, and a spring or other equivalent means 27 attached to collect actuating lever 14 and to some fixed point such as the top of stanchion 28 of the bar feed mechanism 29 of the machine.

Fluid pressure cylinder 16, valve 17, cable 20, spring 27 and the switch operating mechanism may be mounted in any convenient location on the machine. One of the features of this mechanism is its ready adaptability to various designs of machines for, by merely choosing a convenient location for the pressure cylinder and valve, adjusting the length of the flexible cable 20, and selecting proper locations for guide pulleys for the cable, the attachment can be easily and quickly mounted on the machine. If desired, the switch 15 can be relocated for convenience of connection to the collet actuating lever 14, or for direct actuation by cable 20. In its application to the hand screw machine indicated in the drawings, cylinder 16 is conveniently mounted on the underside of oil pan 30, while the control valve 17 is affixed to the carriage 7 by means of a bracket 31 and is connected to the inlet and outlet port 32 of cylinder 16 by means of a flexible fluid conduit 33. The flexible cable 20 attached to piston rod 34 of the fluid pressure mechanism conveniently is carried around a guide pulley 35 mounted underneath pan 30, through an opening in the pan and over a second guide pulley 36 carried by a bracket 37 and arranged substantially in the plane of movement of collet actuating lever 14 to which cable 20 is affixed as by means of a turnbuckle 38 and collar 39.

The return spring 27 (or a suitable counterweight mechanism or other resilient means) conveniently is attached to the same collar 39, and as shown, the other end of spring 27 is secured to the top of stanchion 28 as by means of a turnbuckle 40 which provides means for adjusting the tension in the spring.

In the construction illustrated, connecting rod 22 of the switch operating linkage is joined at one end to switch arm 21 and at the other end to bracket 41, the construction of which is best illustrated in Fig. 3. This can be, for example, a stamping or casting having a round opening 42 to fit over the shaft 43 of the collet actuating mechanism and a second opening 44 to receive the collet actuating lever 14. When this construction is employed, bracket 41 is assembled by removing the lever 14 from shaft 43 and unscrewing it from its connecting fitting 45. Bracket 41 is then slipped over the end of lever 14, and the latter replaced in its fitting 45, after which the assembly is replaced on its shaft 43.

In one common type of hand screw machine a variable drive from the motor to the spindle is secured by means of stepped pulleys on the motor and spindle shafts. In such a machine it is convenient to use one of the steps of the pulley on the spindle as a brake drum, such as the step of pulley 46 (Fig. 2). The cover of housing 12 of the drive mechanism may be notched as at 47 (Fig. 1) to accommodate brake band affixed to a flat spring 48 anchored at its inner end to a bracket 49 affixed to housing 12 or otherwise secured. The purpose of spring 48 is to lift the brake band clear of drum 46 when the brake is released in the manner to be described. Bracket 25 attached to the outer end of the brake band 26, where it passes through the front of housing 12, may be provided with a tubular extension 50 to help preserve the alignment of the bracket when the brake is applied.

The operation of the mechanism described is as follows:

With the parts in the position shown in Figs. 1 and 2, the tool 10 is retracted, collar 13 open, switch 15 off, and brake 23 applied. This position is maintained through fluid pressure in cylinder 16 which, when the cross slide 8 is in the position shown, is connected through valve 17 to a fluid pressure source such as a compressed air pump or cylinder (not shown). The compressed air inlet is indicated at 51. Piston 52 of valve 17 is held to the left as viewed in Fig. 2 by bracket 18 on the cross slide, to which it is affixed or by which it is held against the action of a spring 53 in the valve cylinder. Thus piston 19 of operating cylinder 16 is held to the right as viewed in Fig. 2, applying tension to flexible cable 20. This holds collet actuating lever 14 to the right as viewed in Fig. 1, and through stop 24 on the cable applies tension to the brake band 26.

The operator inserts workpiece W into collet 13. Then he moves the work operating lever 11 upwardly and forwardly to advance tool 10 for operation on the work; for example, to machine the end face of the work. During the first part of the tool advancing movement, cross slide 8 moves to the right as viewed in Fig. 2, moving with it piston 52 of valve 17, or permitting this piston to move under the action of spring 53. As soon as piston 52 has cleared the valve aperture which leads into the flexible conduit 33, pressure within the operating cylinder 16 is released for discharge to the atmosphere or to an accumulator at 54. As a result collet actuating lever 14 is permitted to move to the left as viewed in Fig. 1 under the action of spring 27. This lifts stop 24 free of bracket 25, releasing brake 23, brake band 26 being lifted clear of drum 46 by means of spring 48. Also movement of the collet actuating lever 14 to the left as viewed in Fig. 1 turns switch 15 on to start the motor driving the spindle.

Upon completion of the machining operation, the tool operating lever 11 is returned to its initial position. This moves the piston of control valve 17 to the position shown in Fig. 2, again connecting operating cylinder 16 to the fluid pressure source so as to apply tension to the cable 20 and operate lever 14 to open the collet and turn off switch 15, stopping the motor, and at the same time applying the brake through coaction of stop 24 with bracket 25.

It will be observed that for the completion of the entire operating cycle it is only necessary for the operator to insert the work, operate the tool and then remove the work. Thus the harness attachment which I have devised relieves the operator of turning the switch on and off and of opening and closing the collet. But it does more than this, for it also applies a brake to quickly bring the spindle to a stop as soon as the power is off. Consequently the operation is speeded up both by reducing the number of manual steps to be performed and by decreasing the interval of time between turning off the power (or de-clutching) and removal of the work. These advantages are secured by an extremely simple and inexpensive attachment which, because of its flexibility and adjustability, can be readily mounted on various existing types of machines without the use of special tools and without alterations except of the most minor sort.

The terms and expressions which I have employed are used in a descriptive and not a limiting sense, and I have no intention of excluding such equivalents of the invention described, or of portions thereof, as fall within the purview of the claims.

I claim:

1. An automatic operating mechanism for hand screw machines and the like comprising a fluid pressure cylinder, a valve associated with said fluid pressure cylinder and controlled by the tool operating hand lever of the machine, a piston in said fluid pressure cylinder operatively connected to the work-holding collet of the machine and to the spindle driving means for opening and closing the collet and stopping and starting its rotation, and a brake for the spindle, said piston also being operatively connected to said brake.

2. An automatic operating attachment for machines having a spindle, spindle driving mechanism, a work-holding collet fixed to the spindle, a tool operating hand lever, and a collet actuating hand lever, said attachment comprising a fluid pressure cylinder, a valve associated with said fluid pressure cylinder and controlled by the tool operating hand lever, a piston in said fluid pressure cylinder operatively connected to the collet actuating hand lever and to the spindle driving mechanism, and a brake for the spindle, said piston also being operatively connected to said brake.

3. An automatic operating attachment for machines having a spindle, spindle driving mechanism and a starting lever therefor, a work-holding collet fixed to the spindle, a tool operating hand lever, and a collet actuating hand lever, said attachment comprising a fluid pressure cylinder, a valve associated with said fluid pressure cylinder and controlled by the tool operating hand lever, a piston in said fluid pressure cylinder operatively connected to the collet actuating hand lever and to the starting lever of the spindle driving mechanism, and a brake for the spindle, said piston also being operatively connected to said brake.

4. An automatic operating attachment for machines having a spindle, spindle driving mechanism and a starting lever therefor, a work-holding collet fixed to the spindle, a tool operating hand lever, and a collet actuating hand lever, said attachment comprising a fluid pressure cylinder, a valve associated with said fluid pressure cylinder and controlled by the tool operating hand lever, a piston in said fluid pressure cylinder operatively connected through a flexible cable to the collet actuating hand lever and to the starting lever of the spindle driving mechanism, a brake for the spindle, and a stop on said flexible cable for engagement with an element of said brake to apply the brake when the spindle drive is turned off.

5. An automatic operating mechanism for hand screw machines and the like comprising a fluid pressure cylinder, a valve connected thereto, an arm for attachment to the cross slide of the machine to operate said valve on movement of said cross slide, a piston in said cylinder, a flexible cable connected to said piston for attachment to the collet actuating lever of the machine, a resilient element for attachment to said collet actuating lever to pull it into operating position when said flexible cable is released by release of the piston, a brake element for the spindle, and a stop on said flexible cable for engagement with said brake element to apply the brake when the spindle drive is turned off and the collet actuating lever is returned to its non-operating position.

WILLARD C. BEACH.

REFERENCES CITED

The following references are of record in the file of this patent:

UNITED STATES PATENTS

| Number | Name | Date |
| --- | --- | --- |
| 112,971 | Sheldon | Mar. 21, 1871 |
| 1,354,607 | Faust | Oct. 5, 1920 |
| 1,487,411 | Wasson | Mar. 18, 1924 |
| 1,688,197 | Mayer | Oct. 16, 1928 |
| 1,765,825 | Cork | June 24, 1930 |
| 2,109,114 | Kerr | Feb. 22, 1938 |

FOREIGN PATENTS

| Number | Country | Date |
| --- | --- | --- |
| 465,138 | Germany | Sept. 10, 1928 |